United States Patent
Stewart, III et al.

(10) Patent No.: US 6,572,770 B1
(45) Date of Patent: Jun. 3, 2003

(54) APPARATUS AND METHOD FOR HARVESTING AND COLLECTING ATTACHED ALGAL COMMUNITIES

(75) Inventors: E. Allen Stewart, III, Punta Gorda, FL (US); Mark J. Zivojnovich, Ocala, FL (US)

(73) Assignee: Hydromentia, Inc., Ocala, FL (US)

( * ) Notice: Subject to any disclaimer, the term of this patent is extended or adjusted under 35 U.S.C. 154(b) by 109 days.

(21) Appl. No.: 09/737,151

(22) Filed: Dec. 14, 2000

(51) Int. Cl.⁷ .............................. C02F 3/32; A01H 13/00
(52) U.S. Cl. ..................... 210/602; 210/747; 210/170; 47/1.4
(58) Field of Search ................. 210/602, 615, 210/747, 170; 47/1.4, 63, 64

(56) References Cited

U.S. PATENT DOCUMENTS

| | | | |
|---|---|---|---|
| 3,768,200 A | * 10/1973 | Klock | |
| 4,253,271 A | * 3/1981 | Raymond | |
| 4,333,263 A | 6/1982 | Adey | 210/620 |
| 4,966,096 A | 10/1990 | Adey | 119/3 |
| 5,097,795 A | 3/1992 | Adey | 119/3 |
| 5,131,820 A | 7/1992 | Jensen | 417/415 |
| 5,527,456 A | 6/1996 | Jensen | 210/170 |
| 5,528,856 A | * 6/1996 | Smith et al. | |
| 5,573,669 A | 11/1996 | Jensen | 210/602 |
| 5,591,341 A | 1/1997 | Jensen | 210/602 |
| 5,715,774 A | 2/1998 | Adey et al. | 119/230 |
| 5,778,823 A | 7/1998 | Adey et al. | 119/215 |
| 5,811,007 A | 9/1998 | Stewart et al. | 210/602 |
| 5,820,759 A | 10/1998 | Stewart et al. | 210/602 |
| 5,846,423 A | 12/1998 | Jensen | 210/602 |
| 5,851,398 A | 12/1998 | Adey | 210/602 |
| 5,985,147 A | 11/1999 | Jensen et al. | 210/602 |

OTHER PUBLICATIONS

Restoration Ecology, "Phosphorus Removal from Natural Waters Using Controlled Algal Production" (Mar. 1993).

* cited by examiner

*Primary Examiner*—Fred Prince
(74) *Attorney, Agent, or Firm*—Holland & Knight LLP

(57) ABSTRACT

An apparatus and method for harvesting aquatic plant biomass, and more particularly, to a system and method for harvesting attached algal communities or algal turf whereby water is utilized to transport algal biomass to a central collection location. Additionally, the apparatus and method of the present invention is drawn to a gathering means whereby algal turf or biomass is severed from the ATS and transferred via a towing method, instead of pushing, thereby reducing potential damage to the ATS.

16 Claims, 4 Drawing Sheets

APPARATUS AND METHOD FOR HARVESTING AND COLLECTING ATTACHED ALGAL COMMUNITIES

BACKGROUND OF THE INVENTION

1. Field of the Invention

This invention relates to an apparatus and method for harvesting and collecting aquatic plant biomass, and more particularly, to a system and method for harvesting and collecting attached algal communities or algal turf whereby water is utilized to transport algal biomass to a central collection location.

2. Description of the Background Art

For over one hundred years, government agencies and private entities have been attempting to design and develop strategies for harvesting aquatic plants. Initially, research efforts were directed at removal of aquatic plants from open water systems. Then, during the mid nineteen seventies, as researchers began to investigate the use of aquatic plants in water treatment, investigation began into harvest systems for use in man-made treatment systems.

In natural open water systems, the need to harvest aquatic plants is driven largely by the need to remove nuisance vegetation with capture of nutrient pollutants bound into plant tissue largely a secondary consideration. In constructed water treatment systems, harvesting of aquatic plants is necessary not only to gather plant biomass as a "crop" but also to remove plant tissue and attendant nutrient pollutants and maintain the overall health of the system.

Requisite to the function of many constructed water treatment systems is the cultivation of aquatic plants such as water hyacinth, duckweed or attached algal communities. The concept of artificial algae systems or Algal Turf Scrubbers (hereinafter "ATS") was first developed to permit nutrient management within aquaria-type facilities in which organisms, such as reef corals, which rely upon very low nutrient levels, could be sustained and cultivated. An ATS consists of a natural, mixed assemblage of attached periphyton, microalgae and bacteria which colonise a water floway, usually inclined, over which wastewater or nutrient rich water flows.

ATS are cultured communities of attached or benthic algae that can be used to manage water quality or to scrub a variety of nutrients or contaminants from marine, estuarine, and fresh water. ATS are complex algal communities and, as such, do not demonstrate the sensitivities and instabilities characteristic of monocultures of algae. See Adey, W. H., C. Luckett, and K. Jensen. 1993. "Phosphorus removal from natural waters using controlled algal production". *Restoration Ecology*. March 1993: 29–39.

It was discovered that when accompanied by extensive natural energies, such as currents or wave oscillations, algal communities within an ATS could sustain significant levels of productivity. Subsequently, it was suggested that algal communities could be supported within an engineered system to reduce nutrients, particularly phosphorus, from large volumes of nutrient enriched surface waters, such as wastewater and non-point sources (NPS). Today, ATS systems are used in thousands of aquaria, including a number of large-scale cultivation units (up to 1 million gallons). Studies in maximizing production of algal communities or "algal turf" and its uses continue and are well-known and reported in patents and literature. By way of background, see U.S. Pat. No. 4,333,263 to Adey; U.S. Pat. No. 4,966,096 to Adey; U.S. Pat. No. 5,097,795 to Adey; U.S. Pat. No. 5,778,823 to Adey; U.S. Pat. No. 5,851,398 to Adey; and U.S. Pat. No. 5,715,774 to Adey et al. It should be noted that the foregoing: patents contemplate harvesting algal turf from its growth substrate by means of hand, livestock, fish or machinery. The disclosure and teaching of these patents are incorporated herein by reference in their entirety.

Recently, there has been an increase in aquatic plant based water treatment ("APBWT") applications, primarily in the production of fish for human consumption and in nutrient based water treatment systems. Specifically, aquatic plant based water treatment is a mechanism to address non-point source (NPS) pollution such as nutrient pollutants. If the design and operation of constructed commercial sized aquaculture based facilities is to become economically viable, an improved mechanism to manage aquatic plant biomass is necessary.

The major challenges for water treatment technologies employing aquatic plant systems is accessing the plants, efficiently and economically harvesting and collecting the aquatic biomass, and efficiently and economically processing the harvested aquatic biomass.

Two critical items govern the potential value of the aquatic plant biomass generated from water treatment systems. The cost of production and the quality of the product produced. As the plant tissue of an aquatic plant is typically 95% moisture, the total weight of the wet plant tissue is significantly greater than that of terrestrial crops on an equivalent dry weight basis. Accordingly, handling strategies for harvested aquatic plant biomass are critical to the economic cost of handling the biomass.

Harvesting of algal biomass from an ATS, or biomass management, is critical to the sustained performance of an ATS. Harvesting of algal biomass from an ATS occurs on a regular basis, preferably every seven to twenty-one days. Therefore, it is of paramount importance that the biomass management be efficient and cost effective.

Prior art methods for harvesting aquatic plants in natural open waters systems have focused largely on self-propelled floating harvest devices. Severed or collected plant material is either left floating in the water, chopped and left floating in the water, transported to shore by barge or floating in bales, transported by helicopter, or chopped plant material may be pumped as a slurry to a land-based receiving station. Prior art methods for harvesting aquatic plants in natural open water systems have not been employed in the management of aquatic plants within constructed water treatment systems as the harvest strategies are expensive, thereby driving up the cost of the water treatment technology to unacceptable levels. Aquatic plant harvest strategies employed in constructed water treatment systems reflect continuing attempts to improve harvesting efficiency.

There presently exists several apparatus and methods to harvest algal communities. Early methods of harvesting ATS, usually in small scale installations, included hand harvesting which entailed simply scraping algae off the growth substrate. Specifically, the growth substrate or screens were harvested by physically removing the screen from the scrubber and placing it on an inclined easel. Biomass was removed from the screen by scraping with a moderately sharp implement such as piece of hard polystyrene plastic. Scraped biomass was collected in a strainer and de-watered. Difficulties with a hand scraping approach are two-fold. First, depending upon the size of the ATS, it may be difficult to access all portions of the algal turf. Secondly, harvesting via scraping often incompletely removes portions of the algae and allows dislodged algae fragments to settle within the ATS or otherwise not be collected. Incomplete collection of aquatic biomass may permit the release of nutrients which were taken up by the attached algal communities.

In order to expedite harvesting, approaches utilizing vacuum equipment have been utilized. On a small scale, variations of "shop vacs" have been utilized to vacuum biomass directly from the ATS growth substrate. For large-scale installations, heavy vacuum equipment designed to vacuum the floway has been utilized. A vacuum unit, either tractor pulled or self-propelled, is typically land based and gains right of entry to the ATS via an access road or floway. However, heavy vacuum equipment has significant operation costs when applied to a large scale ATS system.

Other algal turf harvest systems have included structured floways requiring perimeter wall or curbs employed for retaining water in the floway and facilitating movement of the harvest equipment that is too heavy to travel on the synthetic membrane lined ATS.

Continuing efforts are being made to improve ATS and harvesting of algal communities. By way of example, note U.S. Pat. Nos. 5,846,423; 5,591,341; 5,573,669 and 5,527,456 to Jensen. U.S. Pat. No. 5,846,423 discloses a method for purifying water which requires that the sides of the floway be bounded by a pair of curbs disposed in a spaced-apart parallel relationship. Algal turf is harvested by means of a wheeled harvester disposed to roll along the curbs. A harvesting barge is also contemplated to collect, store and transport harvested algal turf slurry as well as relocate the harvester from floway to floway. See also U.S. Pat. Nos. 5,573,669 and 5,527,456 which are related U.S. patents.

U.S. Pat. No. 5,591,341 discloses a conical floway culture system which contemplates harvesting through use of an angled plowing system having a notched, fixed or rotating scraper whereby harvested algal turf is pushed, thereby increasing the possibility of damage to the culture system.

The disclosure and teaching of these patents are incorporated herein by reference in their entirety.

Therefore, it is an object of this invention to provide an improvement which overcomes the aforementioned inadequacies of the prior art devices and provides an improvement which is a significant contribution to the advancement of aquatic biomass management art.

Another object of this invention is to provide a harvest apparatus and method that will allow for the economical harvesting of ATS within a large-scale commercial system.

Another object of this invention is to provide an apparatus and method which permits the collection of algal biomass which continuously sloughs from the ATS for processing, thereby improving treatment capacity and effluent quality.

Another object of this invention is to provide an apparatus and method for harvesting and collecting algal biomass which minimizes the need for heavy equipment for the harvesting and transport of algal biomass.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises an apparatus and method for harvesting and collecting aquatic plant biomass, and more particularly, to a system and method for harvesting attached algal communities or algal turf whereby water is utilized to transport algal biomass to a central collection location. As used herein, attached algal communities shall mean broadly algal turf or any cultivated algal communities which may be present within an algal turf scrubber (ATS).

Additionally, the apparatus and method of the present invention is drawn to a gathering means whereby algal turf or biomass is severed from the ATS and transferred via a towing means, instead of pushing, thereby reducing potential damage to the ATS. In a preferred embodiment, a weighted harvest drag is dragged over the ATS floway. Severed algal biomass is transferred to a conveyance system that preferably comprises one or more flumes where it is conveyed by a water medium to a central harvest station.

In the apparatus and method of the present invention, a conveyance system via an effluent flume receives algal biomass that is introduced during events via the gathering means as well as algal biomass that is introduced continuously as algal biomass is dislodged or sloughed from the ATS. Harvested and sloughed algal biomass is conveyed by water via the conveyance system (e.g. transport flume) to a central harvesting station. In a preferred embodiment, the collected biomass comprising both harvested and sloughed biomass is removed from the conveyance system water medium by means of a self-cleaning bar screen.

In a preferred embodiment, the conveyance system water medium is the effluent from the ATS; however, the conveyance system water medium may also include water from other sources.

Lastly, the apparatus and method of the present invention is drawn to an ATS having a floway system which does not require lateral perimeter curbs nor restrictions on size dimensions. In a preferred embodiment of the present invention, the ATS is constructed without curbing, and thus without distinct separated floways, thereby reducing ATS construction and maintenance costs and eliminating obstructions for the gathering means.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
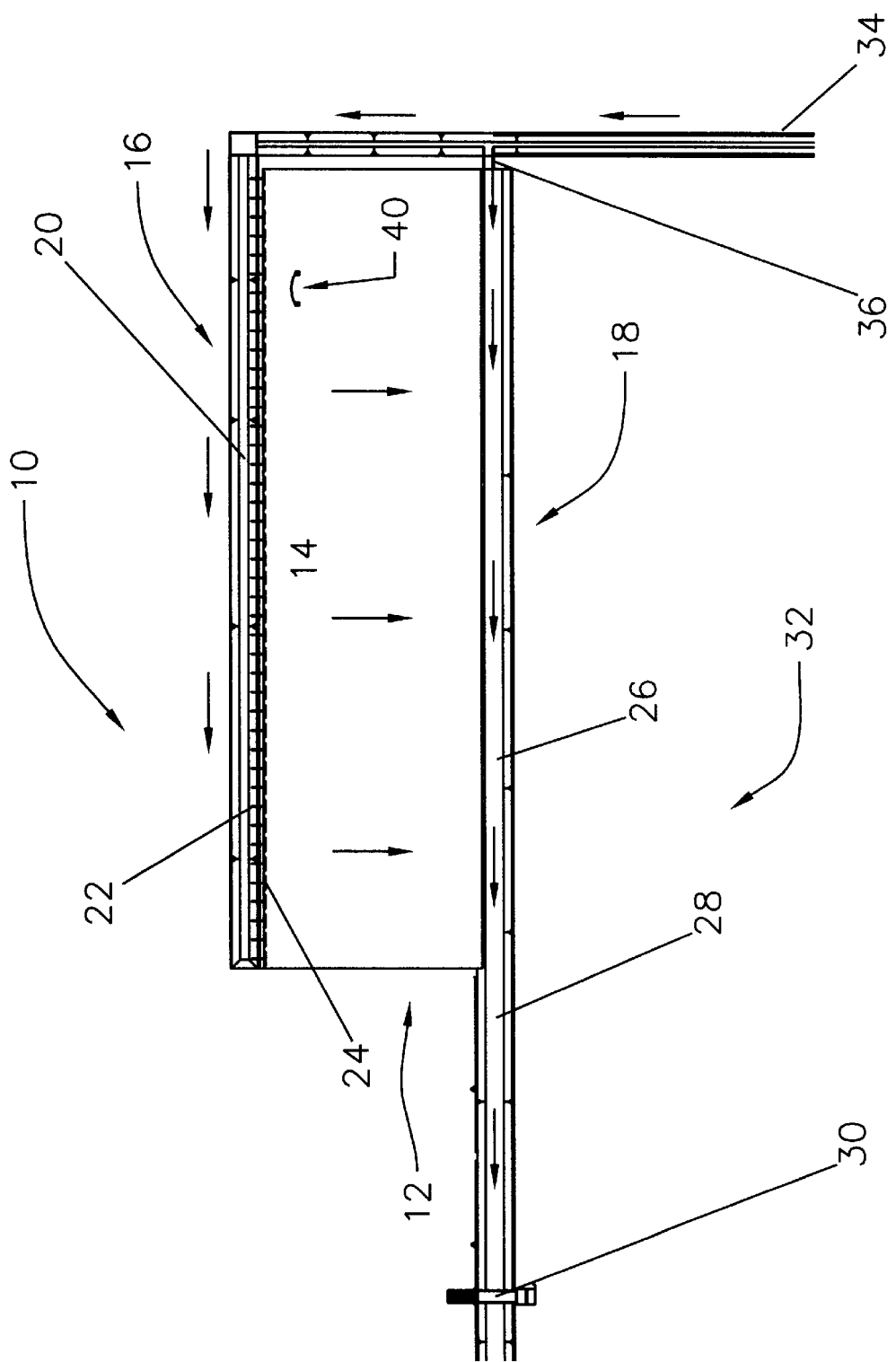
FIG. 1 is a flow diagram illustrating a preferred embodiment of the present invention.

With reference to the drawings, and in particular FIG. 1, a new and improved apparatus and method for harvesting and collecting aquatic plant biomass embodying the principles and concepts of the present invention and generally designated by the reference number 10 will be described.

Key to the present invention is the flow of water through an Algal Turf Scrubber ("ATS") system and the conveyance of severed, dislodged or sloughed aquatic plant biomass to a central harvest station. Therefore, in construction of the ATS, certain design parameters are desired.

Growth of algal communities or "algal turf" can be achieved in an aqueous environment by providing an enclosure for retaining water during growth and treatment wherein the enclosure includes a suitable substrate or ATS growth substrate for algal communities to colonize. The initial colonizations are usually microscopic diatoms which are thereafter dominated by turf species. As used herein, attached algal communities shall mean broadly algal turf or any cultivated algal communities which may be present within an algal turf scrubber (ATS). The algae may be periphytic algae (typically defined as algae which grows attached to submerged surfaces) as well as benthic algae (algae which grows on bottom surfaces). Such algae is commonly freshwater algae, although salt water algae is also acceptable. Algal biomass shall refer to algal communities which are severed from the growth substrate during harvesting events as well as algal communities which are dislodged or sloughed from the growth substrate.

In a preferred approach, to maximize the productivity of an ATS, harvesting of algal communities should occur before they are thereafter overgrown and dominated by large macroalgae or macrophytes. The rate of harvesting events is dependent on light levels, temperature, water culture nutrient concentration, micro nutrient concentration and external energies such as currents or wave oscillations. Algal turf re-growth will occur rapidly if there is vacant surface substrate. In a preferred embodiment, the ATS growth substrate can be a plastic screen, screen assembly or geomembrane grid having a textured surface.

Heretofore, prior art ATS systems have consisted of a series of isolated floways whereby the individual floways are separated by parallel spaced curbs. Typically, the widths of the floways have been between five (5) to twenty-five (25) feet. Often these curbs have been utilized as a support substrate for harvesting equipment, specifically, harvesting equipment such as a vacuum harvester may travel along the curb(s). However, construction of these curbs may unnecessarily add to the cost of constructing an ATS and the inventors of the present invention have discovered through experimentation that separated isolated floways are not necessary to successful operation of an ATS.

Figure 2:
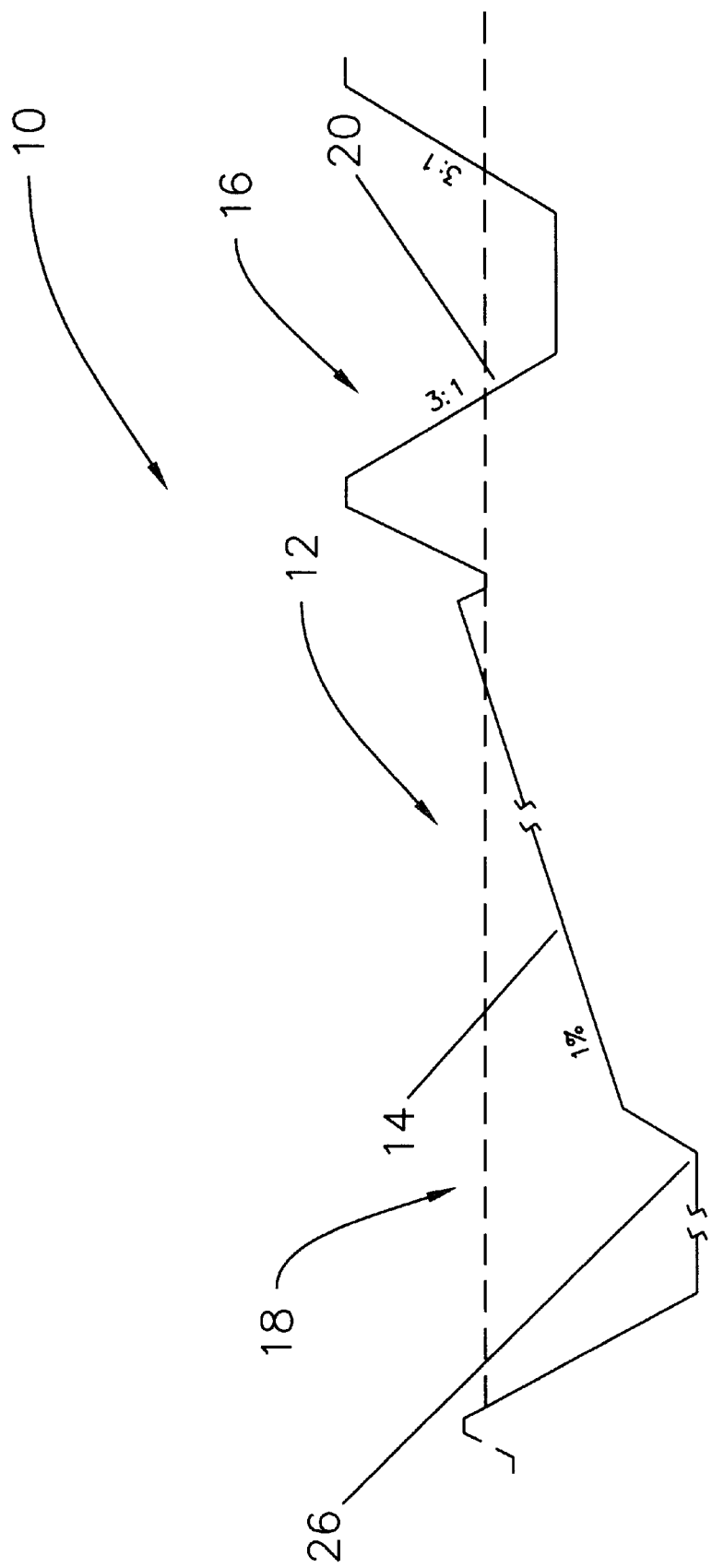
FIG. 2 is a sectional view illustrating a preferred embodiment of the present invention.
Figure 3:
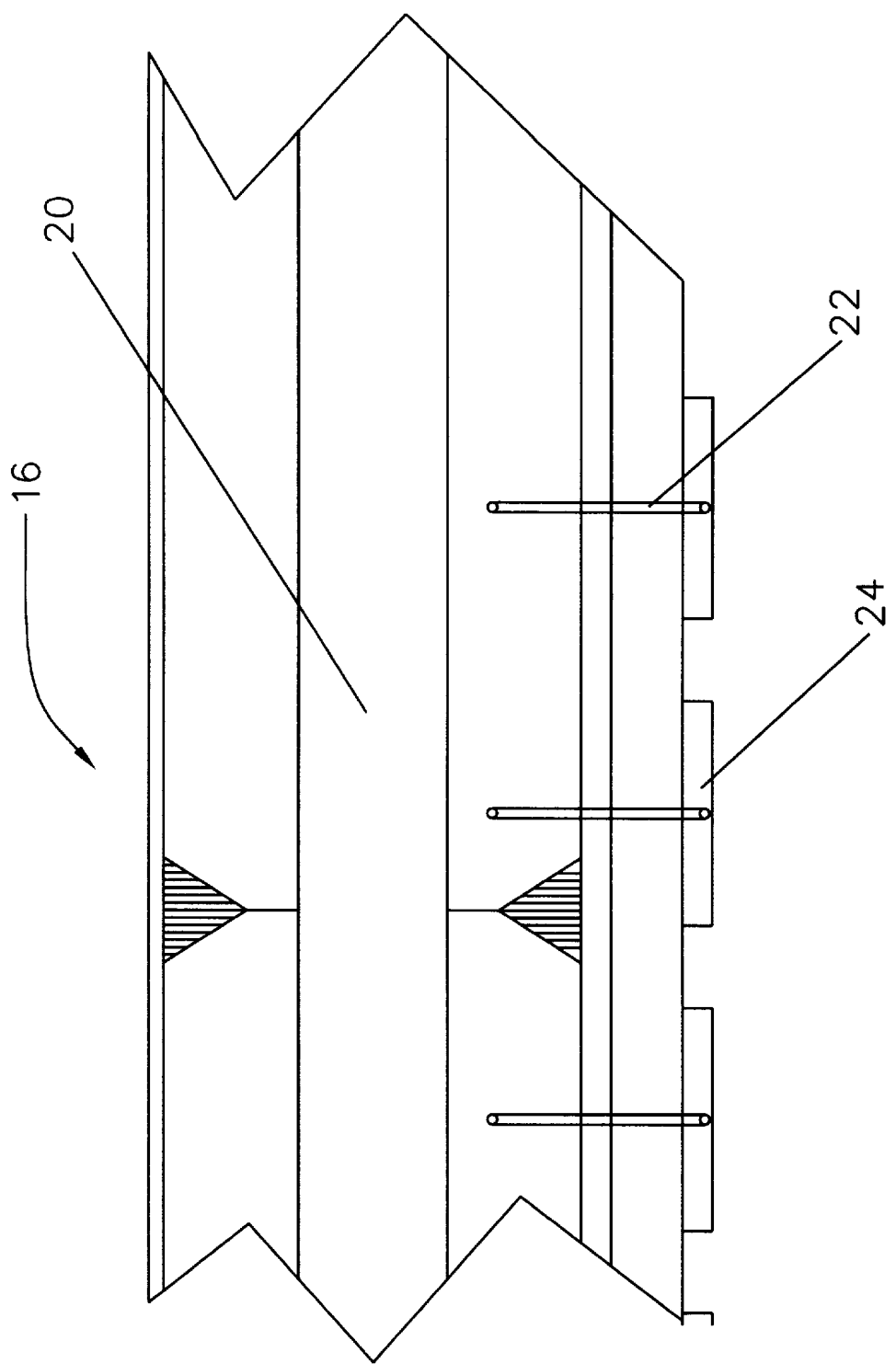
FIG. 3 is a top view of the influent flume and influent inlet means of the present invention.

As shown in FIGS. 1 and 2, in a preferred embodiment, an ATS system 12 utilizing a single floway 14 is constructed that is approximately 840 feet wide by 240 feet in length. The overall size of the ATS system 12 will be determined in part by the water quality parameters to be treated. Specifically, the length of the ATS system may be calculated based on specified water treatment objectives and the width of ATS system calculated based on rate and volume of water to be treated. The ATS preferably incorporates a 1–2% slope from influent side 16 to effluent side 18. As used herein effluent means shall mean any mechanism by which water and algal biomass is discharged from the ATS system, whether gravity or by piping or in other ways customary in the industry. Additionally, a high density polyethylene (HDPE) liner (not shown) is preferably incorporated into the ATS. The ATS further comprises a growth substrate (not shown) in contact with water on which algal communities attach. It is well within the skill of one in the art to size and grade the ATS and ATS floway according to the desired functionality of the ATS (i.e., control of nutrients) and terrain of the installation site. Earthen berms (not shown) or raised sides may border the ATS at distal ends.

In operation, as seen in FIG. 1, water from a distal source (not shown) is conveyed through piping or flume 34 and enters the ATS via the influent side 16 by means of an influent flume 20 and a plurality of influent inlet means such as inlet pipes 22. The influent flume 20 is, preferably, adjacent to and up-gradient of the ATS. The apparatus of the present invention may include a water bypass 36. In a further refinement, surge is created via a plurality of surge devices 24 at the distal end of each influent inlet means to fluctuate flow. The plurality of surge devices may consist of tipping buckets, a tipping gate, other oscillatory means, or self-siphoning device. However, the inclusion of surge devices is not a requirement to the operation of the ATS and apparatus of the present invention and water may be discharged directly onto the ATS. In a further refinement, water flow into the ATS through individual inlet pipes 22 may be regulated by means of riser pipes installed into the end of the inlet pipe 22 which will raise the pipe discharge above the elevation of the water in the influent flume 20, thereby stopping flow.

In initially contemplating the design of an ATS, the inventors intended to utilize an effluent flume solely as a conveyance for water having passed over the ATS. Algal communities from the ATS were to be harvested and collected via prior art means. However, in experimental usage relating to the design of a new ATS and based upon previous experience with aquatic vascular plants, the inventors discovered by happenstance that water flowing through an effluent flume served as an effective mechanism to convey algal biomass to a central harvest station and could help overcome the short comings of the prior art. See U.S. Pat. Nos. 5,811,007 and 5,820,759 to Stewart et al., the disclosures of which are incorporated herein in their entirety by reference.

According to the present invention, the discharge or effluent from the ATS, including any accompanying severed or dislodged algal biomass, is collected within a conveyance system 32 comprising one or more flumes 26 and 28. For ease of discussion the flume immediately adjacent to the ATS system may be designated as an effluent flume 26. Preferably, the conveyance system comprises a series of open channels, such as flumes or canals, which borders the majority of the longitudinal length of an ATS. Preferably, ATS effluent and associated algal biomass enter the conveyance system at multiple discharge points such that the flow converges from incremental sites.

The conveyance system 32 is utilized for the movement of effluent and severed or dislodged algal biomass to a central collection location 30. The conveyance system 32 is designed such that in all stretches or lengths of is course the velocity of the water medium within the conveyance system 32 is maintained at a level sufficient to ensure little sedimentation occurs in the conveyance system 32. That is, the conveyance system 32 is designed to ensure, that particulate matter is conveyed along with the water effluent to the central collection location. By way of example, a water velocity of approximately two (2) feet per second is considered sufficient to scour sand within the conveyance system 32.

As illustrated in FIG. 2, the flume 26 or flumes which comprise the conveyance system 32 are preferably trapezoidal with slide slopes no less than 3:1. The flumes may be constructed of concrete, high density polyethylene (HDPE), poly(vinyl chloride) (PVC) or other construction material.

It is well within the skill of one in the art to determine whether a lower velocity may be utilized to convey algal biomass without undue sedimentation. The most common empirical equation used for open channel flow is Manning's Equation:

$$v = K/n \, R^{2/3} \, S^{1/2} \text{ (English Units) [SI units]}$$

v=Fluid Velocity (ft/s) or [m/s]
K=1.486 (English); K=1.00[SI]
R=Hydraulic Radius (ft) or [m]=A/$P_w$
A=Cross-Sectional Area of Plow (ft$^2$) or [m2]
$P_w$=Wetted Perimeter (ft) or [m]
S=Channel Slope
n=Manning's Roughness Coefficient
Then:

$$Q = vA$$

Q=Fluid Volumetric Flow Rate
A=Fluid Cross-Sectional Area of Flow

Figure 4:
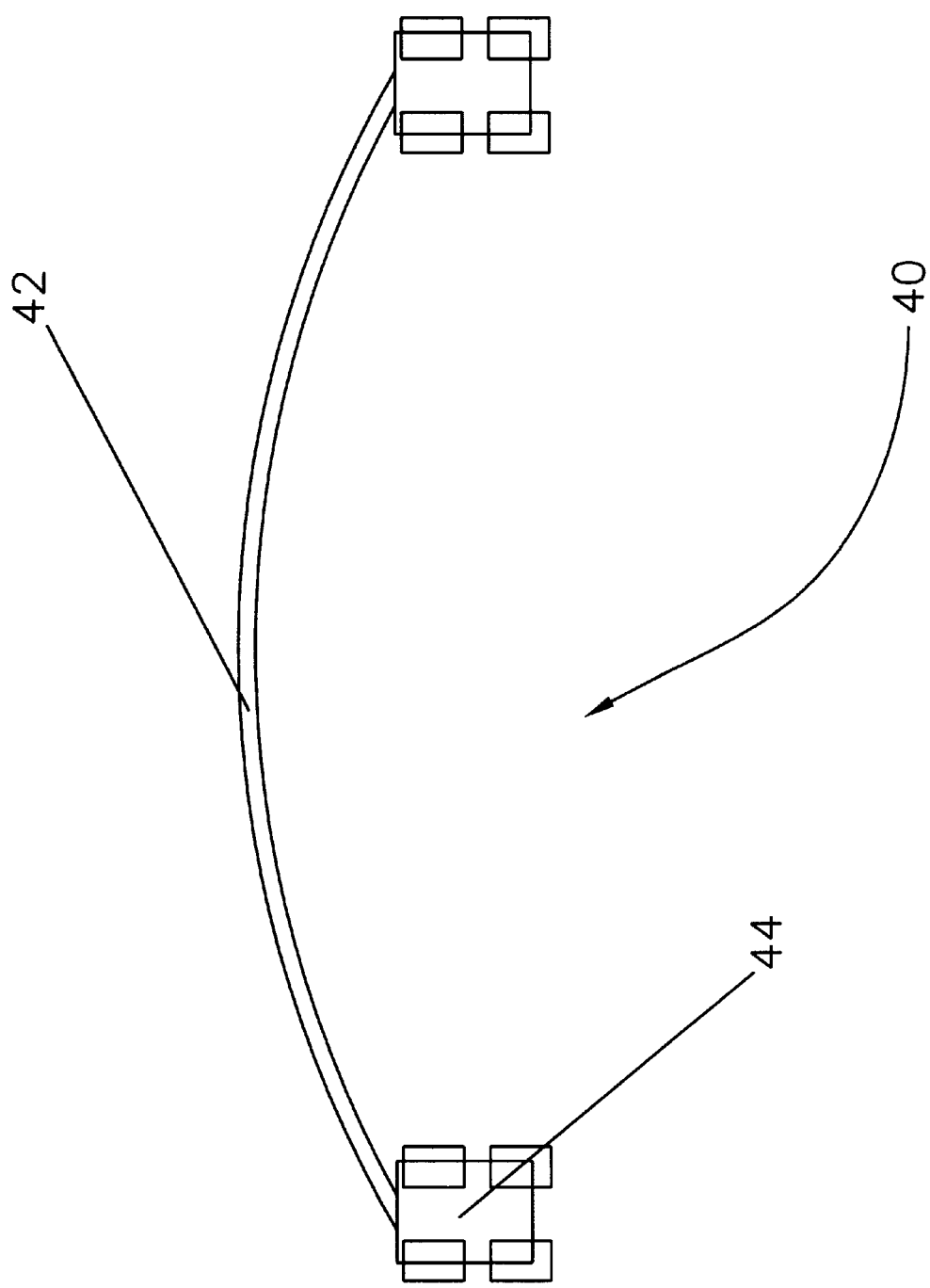
FIG. 4 is a top view of the gathering means of the present invention.

Additionally, the apparatus and method of the present invention is drawn to a unique gathering means, generally designated by the reference number 40, to sever, disengage or otherwise harvest algal communities from the surface of the ATS. Specifically, as illustrated in FIGS. 1 and 4, the gathering means comprises a harvest drag 42 which is mounted at both ends to a wheeled propulsion means or transport vehicle 44 such as a balloon-tired all terrain vehicle (ATV). ATVs are utilized in that their tires put the minimum load on the ATS liner. In an alternative embodiment, the distal end of the harvest drag 42 may be mounted to an ATV with the proximal end dragged by hand (not shown).

In a preferred embodiment, the harvest drag 42 is constructed from a roll of fabric similar in physical characteristics to shade cloth. Generally speaking, shade cloth is a woven polypropylene fabric used for patios, windscreen or privacy fencing which is manufactured in varying percentages to control the amount of elements (i.e., rain, sunlight, wind) admitted. The roll of fabric comprising the harvest drag 42 is preferably six inches in diameter and twenty feet in length. However, the diameter and length of the harvest drag 42 may be readily modified depending on whether both ends of the drag are mounted to ATV vehicles, the weight of the biomass or other operational considerations.

An advantage of utilizing a roll of permeable fabric in constructing the harvest drag 42 is that it allows water to pass through the drag, thereby minimizing the buildup of water down gradient of the drag and further reducing the volume of water and algal biomass that would flow over the drag.

During harvesting events, utilizing the gathering means of the present invention water flow is not adjusted although it may be. As seen in FIG. 1, in use, the harvest drag 42 is pulled in a down gradient along the ATS surface. Algal biomass is severed from the ATS surface and pulled down gradient with the flow of water to the conveyance system 32. As discussed in greater detail below, the algal biomass is transferred via towing to the conveyance system whereby it is transferred via the water medium to a central harvesting station, thereby minimizing the need for surface transport near the ATS and provides for a centralized locale for dewatering and processing of the harvested algal communities.

It should be well understood by one skilled in the art that the gathering means may also incorporate prior art severing methods such as a plow type device.

Algal biomass conveyed via the conveyance system 32 is collected and removed from conveyance system water medium via a self-cleaning bar screen (not shown). Any commercially available bar screen may be utilized in the present application. In a preferred embodiment, a bar screen and attendant self-cleaning apparatus designed and manufactured by Duperon Corporation of Saginaw, Mich., and marketed under the trademark "Flex Rake"™ was utilized. It is well within the skill of one in the art to utilize other screens and methodology as means for removing algal biomass from the conveyance system water medium.

Algal biomass that is collected on the bar screen is cleaned from the screen and discharged to a cross conveyor (not shown). The cross conveyor transports the collected biomass to a concrete receiving station. Alternatively, the cross conveyor could also transfer the collected biomass directly to a transport trailer or other equipment for further processing.

In a further refinement to the preferred embodiment of the present invention, the central harvest station is located in conjunction with an onsite pump station. This design allows for the self-cleaning bar screen to serve a dual function. In addition to removing algal biomass from the conveyance system, the self-cleaning bar screen also serves to prevent the passage of large debris into the pump station. The central harvest station can also be designed as a stand-alone facility.

The apparatus and method of the present invention is primarily designed to be implemented in a constructed water treatment system or aquaculture production facility, whether re-circulating or flow-through. Specifically, the apparatus and method of the present invention may be utilized as a harvesting and collection means for a stand alone ATS or as a component of an Aquatic Planted Based Water Treatment ("APBWT") system which is an integration of water hyacinth and ATS systems.

By utilizing water to convey gathered biomass to a central harvest station, especially in a APBWT where water is being pumped for treatment purposes, the critical function of biomass transportation is achieved at no additional cost. Utilization of water to convey algal biomass to a centralized harvest station should permit the design of larger treatment systems without cost prohibitions relating to harvesting and conveyance of algal biomass.

However, it should be well understood by one skilled in the art that the disclosure of the present invention may be incorporated into the management of biomass in open water systems.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has, been described,

What is claimed is:

1. A constructed water treatment system with improved harvesting and collection means comprising in combination:

an enclosure for retaining water for treatment, the enclosure having an influent inlet means in fluid communication with a water source for admitting water for treatment and an effluent means permitting the discharge of water wherein water flows through said enclosure via at least one floway;

a growth substrate wherein said growth substrate is in contact with water and has algal communities attached to and growing on said growth substrate;

a gathering means whereby at least a portion of said algal communities may be severed from said growth substrate; and a conveyance system wherein algal communities biomass is collected and conveyed by means of a water medium from the enclosure to a collection station.

2. The system of claim 1 wherein said enclosure incorporates a downgrade slope from influent inlet means to effluent means.

3. The system of claim 1 wherein said influent inlet means further comprises at least one surge device.

4. The system of claim 1 wherein said growth substrate is a geomembrane grid.

5. The system of claim 1 wherein the conveyance means comprises at least one flume.

6. The system of claim 5 wherein the conveyance means is comprised of an effluent flume and a transport flume.

7. The system of claim 1 wherein water velocity within the conveyance system is adequate to convey the algal biomass.

8. The system of claim 1 wherein said collection station further comprises a bar screen.

9. The system of claim 1 wherein the enclosure is an algal turf scrubber.

10. A gathering means for harvesting attached algal communities comprising:

at least one wheeled propulsion means;

a harvest drag which is mounted by at least one end to said wheeled propulsion means wherein said wheeled propulsion means travels down gradient over a growth substrate having attached algal communities thereon and said harvest drag severs the attached algal communities and transfers via towing the severed algal communities to a conveyance system.

11. The means of claim 10 wherein said harvest drag is comprised of a roll of permeable fabric.

12. The means of claim 10 wherein said wheeled propulsion means is an all terrain vehicle.

13. A method for harvesting and collecting aquatic plant biomass comprising the steps of:

providing a water treatment system comprising an enclosure for retaining water for treatment, the enclosure having an influent inlet means in fluid communication with a water source for admitting water for treatment and an effluent means permitting the discharge of water wherein water flows through said enclosure via at least one floway;

a growth substrate wherein said growth substrate is in contact with water and has algal communities attached to and growing on said growth substrate;

a gathering means whereby at least a portion of said algal communities may be severed from said growth substrate;

a conveyance system wherein algal communities biomass is collected and conveyed via a water medium from the enclosure to a collection station;

severing algal biomass from the growth substrate;

transferring said algal biomass to said conveyance system;

conveying said algal biomass via the water medium within said conveyance system to said collection station; and collecting the biomass from the conveyance system.

14. The method of claim 13 wherein the conveyance system receives algal biomass that is introduced during harvesting events via the gathering means as well as algal mass that is introduced continuously via sloughing.

15. The method of claim 13 further comprising the step of collecting and removing the algal biomass from the conveyance system by means of a bar screen.

16. The method of claim 15 further comprising the step of discharging the collected and removed biomass to a cross conveyor for further processing.

* * * * *